United States Patent
Singh et al.

(10) Patent No.: US 12,548,023 B2
(45) Date of Patent: Feb. 10, 2026

(54) METHODS AND SYSTEMS FOR BLOCKING MULTI-RAIL CONTACTLESS FRAUD

(71) Applicant: Mastercard International Incorporated, Purchase, NY (US)

(72) Inventors: Sachin Kumar Singh, Pune (IN); Kaushal Naveen Shetty, Thane (IN); Venkata Satya Sivajee Pinnamaneni, Dardenne Prairie, MO (US)

(73) Assignee: Mastercard International Incorporated, Purchase, NY (US)

( * ) Notice: Subject to any disclaimer, the term of this patent is extended or adjusted under 35 U.S.C. 154(b) by 181 days.

(21) Appl. No.: 18/160,347

(22) Filed: Jan. 27, 2023

(65) Prior Publication Data

US 2024/0257129 A1  Aug. 1, 2024

(51) Int. Cl.
*G06Q 20/40* (2012.01)
*G06Q 20/20* (2012.01)
*G06Q 20/32* (2012.01)
*G06Q 20/38* (2012.01)

(52) U.S. Cl.
CPC ......... *G06Q 20/4014* (2013.01); *G06Q 20/20* (2013.01); *G06Q 20/322* (2013.01); *G06Q 20/3821* (2013.01)

(58) Field of Classification Search
CPC .. G06Q 20/4014; G06Q 20/20; G06Q 20/322; G06Q 20/3821
USPC .......................................................... 705/50
See application file for complete search history.

(56) References Cited

U.S. PATENT DOCUMENTS

| | | | |
|---|---|---|---|
| 9,390,412 B2 | 7/2016 | Weber et al. | |
| 10,504,085 B2 | 12/2019 | Phillips et al. | |
| 10,726,412 B2 | 7/2020 | Yehuda et al. | |
| 2014/0258970 A1* | 9/2014 | Brown | G06F 8/47 717/103 |
| 2014/0337237 A1 | 11/2014 | Hayhow et al. | |
| 2015/0237026 A1* | 8/2015 | Kumar | G06Q 20/4012 726/28 |
| 2017/0083985 A1* | 3/2017 | Lacoss-Arnold | G06Q 20/4016 |
| 2023/0179587 A1* | 6/2023 | Wilson Thampi | G06Q 20/405 726/9 |

* cited by examiner

*Primary Examiner* — Zeshan Qayyum
(74) *Attorney, Agent, or Firm* — Hovey Williams LLP

(57) ABSTRACT

A system and method for performing a transaction at a software-based POS system of a merchant includes receiving, from the software-based POS system, a payment authorization request message. A processor is programmed to extract a dynamic hashed security token from the payment authorization request message. In addition, the processor is programmed to validate the dynamic hashed security token and, upon validating the dynamic hashed security token, determine that the software-based POS system that transmitted the payment authorization request message is running a mobile POS software application. Furthermore, the processor is programed to extract the hardware identifier and the application identifier from the transaction data and compare them to account registration information stored with a merchant account. The processor then determines that the hardware identifier and the application identifier match with the account registration information and transmits the payment authorization request message to an issuer associated with the transaction card details.

9 Claims, 8 Drawing Sheets

METHODS AND SYSTEMS FOR BLOCKING MULTI-RAIL CONTACTLESS FRAUD

FIELD OF THE DISCLOSURE

The field of the disclosure relates generally to communication technology and, more particularly, to systems and methods for preventing contactless transaction fraud on a mobile point-of-sale (POS) terminal.

BACKGROUND OF THE DISCLOSURE

In recent years, the use of mobile POS terminals running software-based POS applications has increased. Accompanying the increase in use of such payment means is a rise in fraudulent activity, such as surreptitiously capturing cardholder account data being transmitted between a cardholder's payment card (e.g., a credit, debit, or stored value card) or mobile device and a merchant's POS terminal.

During a payment transaction using a payment card (e.g., a credit, debit, or stored value card), it is important to verify that only a registered payment application on the POS terminal is capturing and transmitting the cardholder's account data for an authorized transaction. Typically, the cardholder has no way to determine whether the POS terminal is a legitimate registered device with the payment processor. In addition, the payment processor typically cannot determine whether a registered payment terminal has been compromised with the addition of a fraud application configured to capture payment card details during a transaction.

These card present transactions are considered pushed payment transactions i.e., the cardholder is providing explicit consent to use his or her payment card/mobile device for the transaction. Dispute resolution for such transactions can be difficult for the cardholder. This can result in reduced confidence of a cardholder for performing a transaction at a mobile POS terminal, which causes loss of revenue for the merchant.

SUMMARY OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computer-implemented method performed by a computing device is provided. The method includes receiving, from a software-based point-of-sale (POS) system operated by a merchant, a payment authorization request message. The payment authorization request message includes transaction data and a dynamic hashed security token. The transaction data includes transaction card details, a hardware identifier, an application identifier, and a merchant identifier that corresponds to the merchant. The method includes extracting the dynamic hashed security token from the payment authorization request message and validating the dynamic hashed security token. Furthermore, the method includes, upon validating the dynamic hashed security token, determining that the software-based POS system that transmitted the payment authorization request message is running a mobile POS software application. The method also includes extracting the hardware identifier and the application identifier from the transaction data and comparing the hardware identifier and the application identifier to account registration information stored with the merchant account on a database associated with the computing device. Moreover, the method includes determining that the hardware identifier and the application identifier match with the account registration information. Additionally, the method includes transmitting the payment authorization request message to an issuer associated with the transaction card details.

In another aspect, a computing device is provided. The computing device includes a database having a dynamic hashed security token record and a merchant account stored thereon. The dynamic hashed security token record and the merchant account are associated with a merchant. The merchant account is further associated with account registration information of the merchant. The computing device also includes a processor and a memory device including computer-readable instructions stored thereon, that when executed by the processor, cause the processor to perform operations including, receiving, from a software-based point-of-sale (POS) system operated by the merchant, a payment authorization request message. The payment authorization request message includes transaction data and a dynamic hashed security token. The transaction data includes transaction card details, a hardware identifier, an application identifier, and a merchant identifier that corresponds to the merchant. The processor is programmed to extract the dynamic hashed security token from the payment authorization request message and validate the dynamic hashed security token. Furthermore, the processor is programmed to determine that the software-based POS system that transmitted the payment authorization request message is running a mobile POS software application. The processor extracts the hardware identifier and the application identifier from the transaction data and compares the hardware identifier and the application identifier to the account registration information stored with the merchant account on the database. Moreover, the processor is programmed to determine that the hardware identifier and the application identifier match with the account registration information and transmit the payment authorization request message to an issuer associated with the transaction card details.

In yet another aspect, a non-transitory computer readable storage medium is provided. The non-transitory computer readable storage medium includes computer readable instructions that, when executed by a processor, cause the processor to perform operations including receiving, from a software-based point-of-sale (POS) system operated by a merchant, a payment authorization request message. The payment authorization request message includes transaction data and a dynamic hashed security token. The transaction data includes transaction card details, a hardware identifier, an application identifier, and a merchant identifier that corresponds to the merchant. The instructions also cause the processor to extract the dynamic hashed security token from the payment authorization request message and validate the dynamic hashed security token. Furthermore, the instructions also cause the processor to determine that the software-based POS system that transmitted the payment authorization request message is running a mobile POS software application upon validating the dynamic hashed security token. In addition, the instructions also cause the processor to extract the hardware identifier and the application identifier from the transaction data and compare the hardware identifier and the application identifier to account registration information stored with the merchant account on a database associated with the computing device. The instructions also cause the processor to determine that the hardware identifier and the application identifier match with the account registration information and transmit the payment authorization request message to an issuer associated with the transaction card details.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

Example Transaction System

Figure 1:
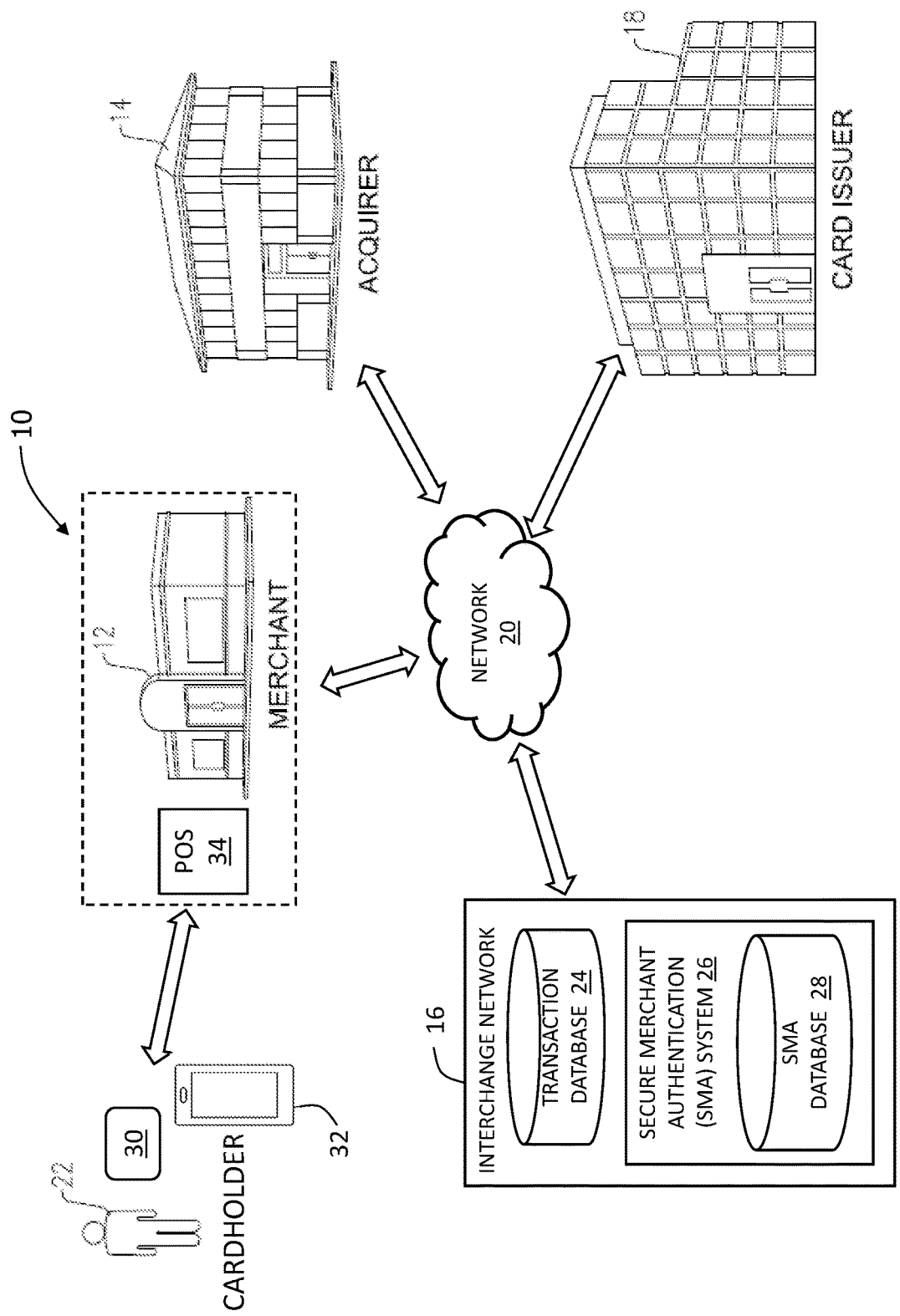
FIG. 1 is a block diagram of an example multi-party payment card network system having a secure merchant authentication (SMA) component, in accordance with an aspect of the present invention.

FIG. 1 is a block diagram of an example multi-party payment card network system 10 having a secure merchant authentication (SMA) component 26 (broadly, a secure merchant authentication system). As used herein, the term "component" includes software or hardware particularly programmed to receive input, perform one or more processes as described herein using the input, and provide an output resulting from the performance of the one or more processes. The input, output, and processes performed by various components will be apparent to one skilled in the art based on the present disclosure.

In the exemplary embodiment, the payment card network system 10 facilitates providing interchange network services offered by an interchange network 16. In addition, the payment card network system 10 enables payment card transactions in which merchants 12, acquirers 14, and/or issuers 18 do not need to have a one-to-one relationship. Although parts of the payment card network system 10 are presented in one arrangement, other embodiments may include the same or different parts arranged otherwise, depending, for example, on authorization processes for purchase transactions, communication between computing devices, etc.

As used herein, the phrase "payment card network" or "interchange network" includes a system or network used for the transfer of funds between two or more parties using cash-substitutes. Transactions performed via a payment card network may include, for example, goods and/or service purchases, credit purchases, debit transactions, fund transfers, account withdrawals, and the like. Payment card networks may be configured to perform such transactions using cash-substitutes including, for example, and without limitation, payment cards, checks, financial accounts, and the like. The phrases payment card network and/or interchange network may include the payment card network as an entity, and the physical payment card network, such as the equipment, hardware, and software making up the network.

In the example embodiment, the payment card network system 10 generally includes the merchants 12, the acquirers 14, the interchange network 16, and the issuers 18, coupled together in communication via a network 20. The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 20 may include more than one type of network, such as a private payment transaction network provided by the interchange network 16 to the acquirers 14 and the issuers 18 and, separately, the public Internet, which may facilitate communication between the merchants 12, the interchange network 16, the acquirers 14, and cardholders 22, etc.

Embodiments described herein may relate to a transaction card system, such as a credit card payment system using the Mastercard® interchange network. (Mastercard is a registered trademark of MasterCard International Incorporated.) The Mastercard interchange network is a set of proprietary communications standards promulgated by Mastercard International Incorporated for the exchange of transaction data and the settlement of funds between financial institutions that are members of Mastercard International Incorporated. As used herein, transaction data includes a unique account number (e.g., a primary account number (PAN)) associated with an account holder or cardholder 22 using a payment card, such as a payment card 30, issued by an issuer; purchase data representing a purchase made by the cardholder, including a type of merchant, amount of purchase, date of purchase; and other data, which may be transmitted between any parties of the multi-party payment card network system 10. In some embodiments, the unique account number (PAN) and/or other cardholder account data issued by the issuer may be associated with a payment application executable on a cardholder mobile device, such as a mobile device 32. In such embodiments, the transaction data includes the PAN (or associated token) in the payment application on the mobile device 32, the purchase data, and other data, which may be transmitted between any parties of the multi-party payment card network system 10. The cardholder mobile device 32 may be, for example, a cellular telephone, a smart watch or other electronic wearable apparel, a tablet, an implanted smart device, a personal computing device, or any other electronic device capable of two-way digital communications that may be associated with a cardholder, such as the cardholder 22. In some embodiments, the mobile device 32 may be replaced with another computing device suitable for performing the functions disclosed herein (e.g., a desktop or laptop computer, a smart television, etc.).

In a typical transaction card system, a financial institution called the "issuer" issues the payment card 30, such as a credit card, to a cardholder, such as the cardholder 22, who uses the payment card 30 to tender payment for a purchase from the merchant 12. In other embodiments, the issuer issues a PAN or token associated with the PAN to a payment application of the cardholder's mobile device, such as the mobile device 32. In the example embodiment, the merchant 12 is typically associated with products, for example, and without limitation, goods and/or services, that are offered for sale and are sold to the cardholders 22. The merchant 12 includes, for example, a physical location and/or a virtual location. A physical location includes, for example, a brick-and-mortar store, etc., and a virtual location includes, for example, an Internet-based storefront.

To accept payment with the payment card 30 or mobile device 32, the merchant 12 must normally establish an account with a financial institution that is part of the payment card network system 10. This financial institution is usually called the "merchant bank," the "acquiring bank," or the acquirer 14. When the cardholder 22 tenders payment for a purchase with the payment card 30 or mobile device 32, the merchant 12 requests authorization from the acquirer 14 for the amount of the purchase. The request may be performed over the telephone but is usually performed through the use of a point-of-sale (POS) terminal, such as the software-based POS system 34, that reads the cardholder's account information from a magnetic stripe, a chip, or embossed characters on the payment card 32 or via a transceiver of the mobile device 32 and communicates electronically with the transaction processing computers of the acquirer 14. Alternatively, the acquirer 14 may authorize a third party to perform transaction processing on its behalf. In this case, the software-based POS system 34 will be configured to communicate with the third party. Such a third party is usually called a "merchant processor," an "acquiring processor," or a "third party processor." A POS terminal, as used herein, includes a mobile POS terminal running a software-based POS system thereon.

Using the interchange network 16, computers of the acquirer 14 or merchant processor will communicate with computers of the issuer 18 to determine whether the cardholder's account is in good standing and whether the purchase is covered by the cardholder's available credit line. Based on these determinations, the request for authorization will be declined or accepted. If the request is accepted, an authorization code is issued to the merchant 12.

When a request for authorization is accepted, the available credit line of the cardholder's account is decreased. Normally, a charge for a payment card transaction is not posted immediately to the cardholder's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the software-based POS system 34. This may include bundling of approved transactions daily for standard retail purchases. If the cardholder 22 cancels a transaction before it is captured, a "void" is generated. If the cardholder 22 returns goods after the transaction has been captured, a "credit" is generated. The interchange network 16 and/or the issuer 18 stores the payment card information (such as, and without limitation, a type of merchant, a merchant identifier, a location where the transaction was completed, an amount of purchase, and a date and time of the transaction) in a transaction database 24.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among the merchant 12, the acquirer 14, and the issuer 18. Settlement refers to the transfer of financial data or funds among the merchant 12, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12.

In some embodiments, the payment card transaction is a card present transaction conducted, for example, by swiping or dipping a payment card at the merchant's software-based POS system 34. Alternatively, the payment card transaction may be conducted by tapping the mobile device 32 at the software-based POS system 34, thereby using, for example, account information or payment card data stored as digital wallet data in an electronic wallet (i.e., payment application) on the mobile device 34.

The interchange network 16 includes the SMA component 26 that is configured to analyze various data associated with the payment card transaction and provide various authentication data to one or more parties involved in the payment card transaction, such as the merchant 12 and the acquirer 14. In particular, the SMA component 26 is a specially programmed computer system that facilitates preventing fraudulent applications from performing a transaction on the software-based POS system 34. In addition, the SMA component 26 is configured to generate and transmit a dynamic hashed security token (see FIG. 5) to the software-based POS system 34, which enables a cardholder, such as the cardholder 22, to authenticate or validate the software-based POS system 34. For example, in an embodiment, the dynamic hashed security token may include an image, such as a merchant logo, in which the cardholder 22 can click or tap to reveal certain authentication data for the merchant. Furthermore, the SMA component 26 may 26 may implement an offline smart token (see FIG. 5) that is configured to monitor application activity related to a transceiver of the software-based POS system 34. For example, if an application other than a registered POS application (see FIG. 5) accesses transaction data being passed wirelessly via the transceiver (e.g., via an NFC transaction), the offline smart token captures the account details (e.g., the PAN) and transmits the account details to the interchange network 16 and/or issuer, for example, for blacklisting.

The SMA component 26 is specially programmed with a plurality of computer-executed instructions and/or algorithms that are configured to generate the dynamic hashed security token upon initialization of the software-based POS system 34. The computer-executed instructions and/or algorithms are also configured to cause the SMA component 26 to read and/or extract the dynamic hashed security token and other transaction data from a payment authorization request message and process the token/data using an SMA database 28 to authenticate the software-based POS system 34 and before processing the transaction. The computer-executed instructions and/or algorithms are further configured to place a block on a payment account if the SMA component 26 receives an indication that the account details may have been compromised on the software-based POS system 34.

In the exemplary embodiment, the software-based POS system 34 may additionally be configured to facilitate the merchant 12 to setup an account with the SMA component 26 or another component of the interchange network 16. During the account setup process, the merchant 12 may transmit, via the software-based POS system 34, account registration information including, for example, and without limitation, hardware identification data (e.g., an Electronic Serial Number (ESN), Mobile Equipment Identifier (MEID), International Mobile Equipment Identity (IMEI) number, and the like) of the software-based POS system 34 and payment application identification data of a POS software application 502 (see FIG. 5) that captures a customer's card details during a transaction.

For instance, the SMA component 26 may receive account registration information from the software-based POS system 34, including a hardware identifier (e.g., IMEI number, SIM identifier, and/or other unique device identifier) and an application identifier for the POS software application 502. In some embodiments, the merchant 12 may for example, setup the account with the SMA component 26 by providing the account registration information and generating a login identifier (i.e., a UserID) and a password used when logging into the POS software application 502 for communicating with the SMA component 26. The merchant 12 may transmit various information or data to the SMA component 26 via the POS software application 502, which may be stored on, partially stored on, or accessed via the software-based POS system 34. The information or data transmitted by the merchant 12 to the SMA component 26 may include, for example, and without limitation, transaction data captured and/or generated during a payment transaction between the merchant 12 and the cardholder 22. The SMA component 26 may 26 may generate a new account profile or update an existing account profile for the account associated with the account registration information received from the software-based POS system 34.

Figure 2:
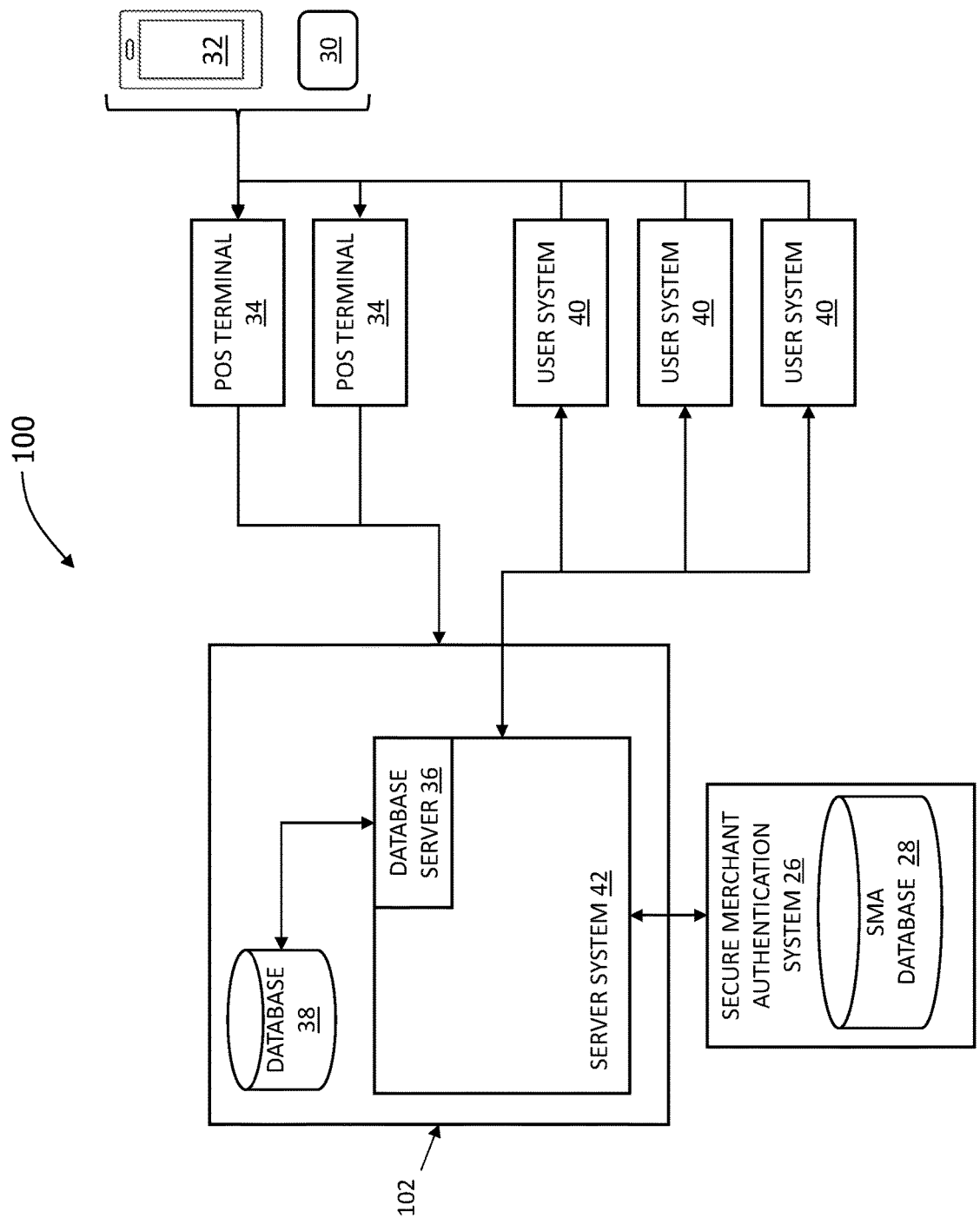
FIG. 2 is a simplified block diagram of an example payment network for authenticating and validating a merchant software-based POS system using the SMA component shown in FIG. 1.

FIG. 2 is a simplified block diagram of an example payment network 100 including a transaction processing system 102 for authenticating and validating a merchant software-based POS system using the SMA component 26. In some embodiments, the payment network 100 is similar to the payment card network system 10 (shown in FIG. 1). In the example embodiment, the payment network 100 includes a plurality of computing devices connected in accordance with the present disclosure. The payment network 100 includes a server system 42 of the transaction processing system 102 coupled in communication with a point-of-sale (POS) terminal 34 located at a merchant 12 (shown in FIG. 1), and/or other user systems 40 associated with merchants, merchant banks, payment networks, and/or issuer banks.

More specifically, in the example embodiment, the transaction processing system 102 includes the server system 42, which may be part of the interchange network 16 (shown in FIG. 1). The server system 42 is coupled in communication with the software-based POS system 34 and the user systems 40 associated with merchants, merchant banks, payment networks, and/or issuer banks. The server system 42 is also coupled in communication with a plurality of client subsystems, also referred to as the user systems 40. In one embodiment, the user systems 40 are computers including a web browser, such that server system 42 is accessible to the user systems 40 using the Internet. The user systems 40 are interconnected to the Internet through one or more of many interfaces including, for example, a network, such as a LAN or WAN, dial-in-connections, cable modems, and/or special high-speed Integrated Services Digital Network (ISDN) lines. The user systems 40 could be any device capable of interconnecting to the Internet including an Internet connected phone, a PDA, or any other suitable web-based connectable equipment.

In the example embodiment, the transaction processing system 102 also includes one or more software-based POS systems 34 (e.g., mobile POS terminals running software-based POS systems), which may be connected to the user systems 40 and the server system 42. The software-based POS systems 34 may be interconnected to the Internet (or any other network that allows the software-based POS systems 34 to communicate as described herein) through many interfaces including a network, such as with a mobile phone network, Global System for Mobile communications (GSM), 3G, 4G, 5G, or other mobile data network, a local area network (LAN) or a wide area network (WAN), dial-in-connections, cable modems, wireless modems, and/or special high-speed ISDN lines. The POS terminal(s) 34 is any device capable of interconnecting to the Internet and including an input device capable of reading information from a cardholder's financial payment card 30 (shown in FIG. 1) or mobile device 32 (shown in FIG. 1). As used herein, the terms POS device, POS terminal, point-of-sale device, and point-of-interaction device are used broadly, generally, and interchangeably to refer to any device in which a cardholder interacts with a merchant to complete a payment card transaction.

A database server 36 is connected to a database 38, which is configured to store information on a variety of matters, including information used to authenticate and validate a merchant POS terminal before processing transactions as described below in greater detail. In one embodiment, the database 38 is a centralized database stored on the server system 42. The database 38 can be accessed by potential users at one of the user systems 40 by logging onto the server system 42 through one of the user systems 40. In an alternative embodiment, the database 38 is stored remotely from the server system 42 and may be a distributed or non-centralized database.

In one example embodiment, the database 38 may include a single database having separated sections or partitions or may include multiple databases, each being separate from each other. The database 38 may store transaction data generated as part of sales activities and savings activities conducted over the processing network including data relating to merchants, account holders or customers, issuers, acquirers, savings amounts, savings account information, and/or purchases made. The database 38 may also store account data including at least one of a cardholder name, a cardholder address, an account number, and other account identifier. The database 38 may also store merchant data including a merchant identifier that identifies each merchant registered to use the network, and instructions for settling transactions including merchant bank account information. The database 38 may also store purchase data associated with items being purchased by a cardholder from a merchant, and authorization request data. The database 38 may also store device information, payment card information, and other data involved with processing transactions between one or more parties.

In the example embodiment, one of the user systems 40 may be associated with the acquirer 14 (shown in FIG. 1) while another one of the user systems 40 may be associated with the issuer 18 (shown in FIG. 1). The software-based POS system 34 may be associated with the merchant 12 (shown in FIG. 1) or may be a computer system and/or mobile system (e.g., a kiosk, self-checkout device, etc.) used by a cardholder 22 making a purchase or payment. The server system 42 may be associated with the interchange network 16 or a payment processor. In the example embodiment, the server system 42 is associated with a financial transaction processing network, such as the interchange network 16, and may be referred to as an interchange computer system. The server system 42 may be used for processing transaction data. In addition, the user systems 40 and the software-based POS system 34 may include a computer system associated with at least one of a merchant, an online bank, a bill payment outsourcer, an acquirer bank, an acquirer processor, an issuer bank associated with a payment card, an issuer processor, a remote payment processing system, and/or a biller.

In the example embodiment, the transaction processing system 102 is in communication with the SMA component 26 and the SMA database 28, which may be associated with the interchange network 16 or with an outside third party in a contractual relationship with the interchange network 16. In some embodiments, the SMA component 26 and the SMA database 28 are in communication with each other and may directly interact during the processing of payment card transactions. In the example embodiment, the SMA component 26 reads and/or extracts dynamic hashed security tokens and other transaction data from payment transactions. In particular, the SMA component 26 reads and/or extracts such information from payment authorization request messages. The SMA component 26 processes the dynamic hashed security tokens and transaction data to authenticate the software-based POS system before processing the transaction.

The SMA database 28 provides account information corresponding to the merchant account associated with the payment transaction, including dynamic hashed security tokens, POS terminal device information, and the like. In some embodiments, the SMA component 26 and/or the SMA database 28 are also in communication with a merchant system and/or an issuer system (e.g., the user systems 40) and/or the software-based POS system 34 of the merchant. It is noted that the payment network 100 may include more, fewer, or alternative components and/or perform more, fewer, or alternative actions, including those discussed elsewhere herein.

Figure 3:
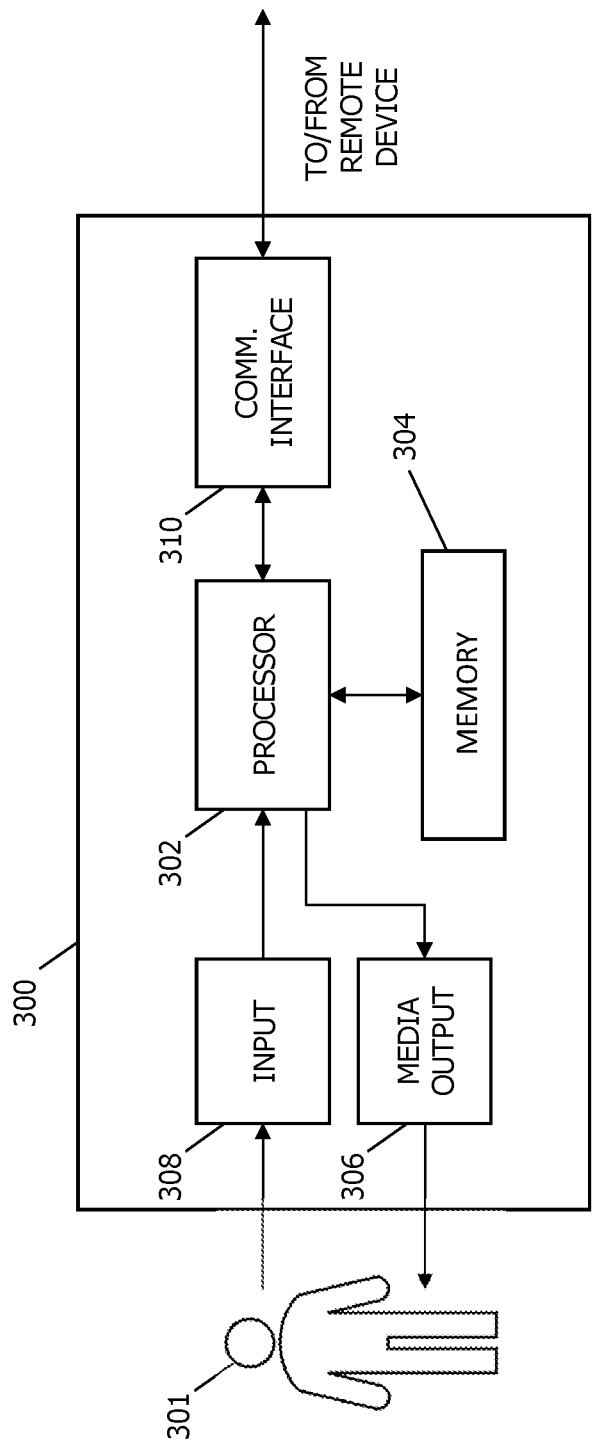
FIG. 3 is an example configuration of a user system operated by a user, such as a cardholder or merchant of the multi-party payment card network system shown in FIG. 1.

FIG. 3 is an example configuration of a user system 300 operated by a user 301, such as the cardholder 22 (shown in FIG. 1) or merchant 12. In some embodiments, the user system 300 is a cardholder mobile device 32 (shown in FIG. 1), a merchant software-based POS system 34 (shown in FIG. 2), and/or a user system 40 (shown in FIG. 2). In the example embodiment, the user system 300 includes a processor 302 for executing computer-executable instructions and/or algorithms. In some embodiments, computer-executable instructions are stored in a memory device 304. The processor 302 includes one or more processing units, for example, in a multi-core configuration. The memory device 304 is any device allowing information such as transaction data, computer-executable instructions, and/or written works to be stored and retrieved. The memory device 304 includes one or more computer readable media.

A location of the user system 300 can be obtained through conventional methods, such as a location service (e.g., global positioning system (GPS) service) in the user system 300, "ping" data that includes geotemporal data, from cell location register information held by a telecommunications provider to which the user system 300 is connected, and the like. For example, in one suitable embodiment, a GPS chip (not shown) can be part of or separate from the processor 302 to enable the location of the user system 300 to be determined.

The user system 300 also includes at least one media output component 306 for presenting information to the user 301. The media output component 306 is any component capable of conveying information to the user 301. In some embodiments, the media output component 306 includes an output adapter such as a video adapter and/or an audio adapter. An output adapter is operatively coupled to the processor 302 and operatively connectable to an output device such as a display device, a liquid crystal display (LCD), a light emitting diode (LED) display, an organic light emitting diode (OLED) display, or "electronic ink" display, or an audio output device, a speaker, or headphones.

In some embodiments, the user system 300 includes an input device 308 for receiving input from the user 301. The input device 308 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both an output device of the media output component 306 and the input device 308. The user system 300 may also include a communication interface 310, which is communicatively connectable to a remote device such as the software-based POS system 34 (shown in FIG. 2) and/or the server system 42 (shown in FIG. 2). The communication interface 310 may include, for example, a wired or wireless network adapter or a wireless data transceiver for use with Bluetooth communication, radio frequency communication, near field communication (NFC), and/or with a mobile phone network, Global System for Mobile communications (GSM), 3G, 4G, 5G, or other mobile data network, and/or Worldwide Interoperability for Microwave Access (WiMax) and the like.

Stored in the memory device 304 are, for example, computer-executable or -readable instructions for providing a user interface to the user 301 via the media output component 306 and, optionally, receiving and processing input from the input device 308. A user interface may include, among other possibilities, a web browser and a client application. Web browsers enable users, such as the user 301, to display and interact with media and other information typically embedded on a web page or a website from the server system 42. A client application allows the user 301 to interact with a server application from the server system 42.

In the example embodiment, the computing device 300 is a user computing device from which the user 301 engages with a merchant (e.g., the merchant 12 shown in FIG. 1), an interchange network (e.g., the interchange network 16 shown in FIG. 1), and an issuer of a payment card (e.g., the issuer 18 shown in FIG. 1) to perform a payment transaction.

Figure 4:
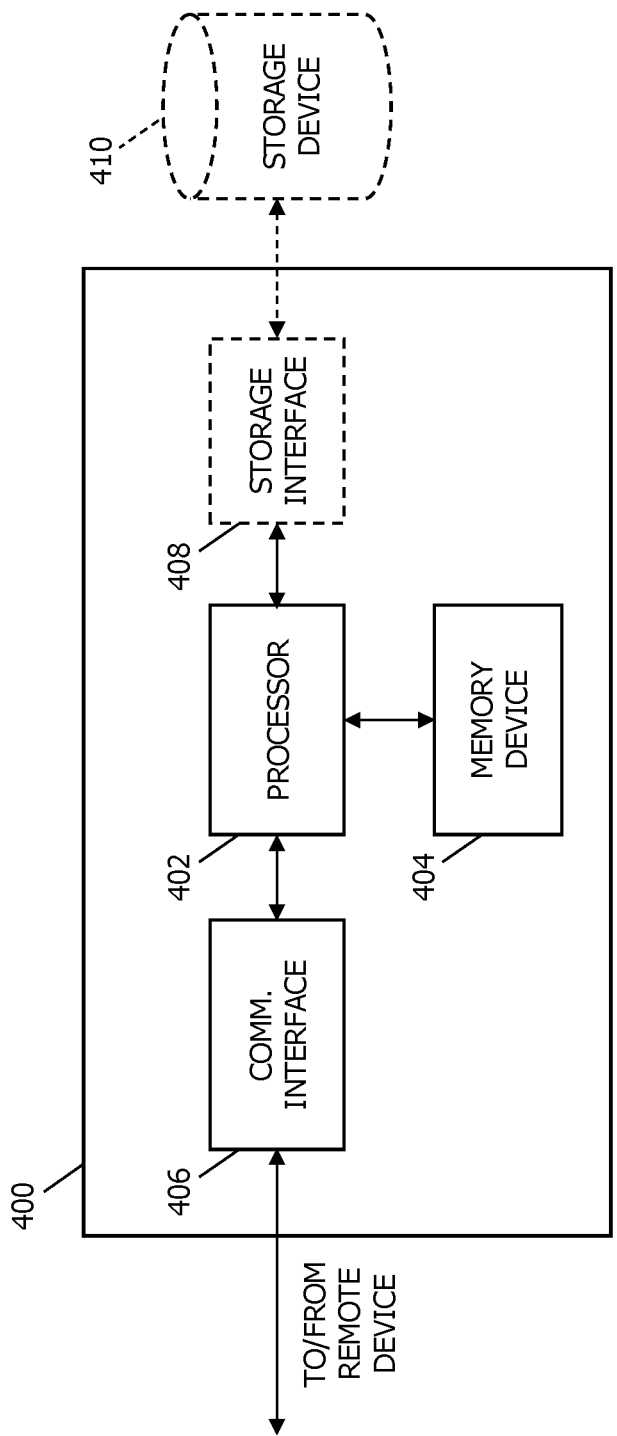
FIG. 4 is an example configuration of a server system, such as a server system for use in the payment network shown in FIG. 2.

FIG. 4 is an example configuration of a server system 400, such as the server system 42 (shown in FIG. 2). The server system 400 includes, but is not limited to, the transaction database 24 (shown in FIG. 1), the SMA component 26, and/or the SMA database 28. In the example embodiment, the server system 400 includes a processor 402 for executing computer-executable instructions. The computer-executable instructions may be stored in a memory device 404, for example. The processor 402 includes one or more processing units (e.g., in a multi-core configuration) for executing the computer-executable instructions. The computer-executable instructions may be executed within a variety of different operating systems on the server system 400, such as UNIX, LINUX, Microsoft Windows®, etc. More specifically, the computer-executable instructions may cause various data manipulations on data stored in a storage device 410 (e.g., create, read, update, and delete procedures). It should also be appreciated that upon initiation of a computer-based method, various computer-executable instructions may be executed during initialization. Some operations may be required to perform one or more processes described herein, while other operations may be more general and/or specific to a programming language (e.g., C, C#, C++, Java, or other suitable programming languages, etc.).

The processor 402 is operatively coupled to a communication interface 406 such that the server system 400 can communicate with a remote device such as a user system 300 (shown in FIG. 3) or another server system 400. For example, the communication interface 406 may receive communications from the cardholder's mobile device 32 or a user system 40 via the Internet, as illustrated in FIG. 2.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is similar to the transaction database 24. For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory device 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In the example embodiment, server system 400 is a secure merchant authentication system in communication with one or more of the merchant 12, the acquirer 14, and the issuer 18 during a payment transaction associated with a user, such as the cardholder 22 (shown in FIG. 1). The server system 400 checks for account restrictions for accounts (e.g., PANs) initiating a payment transaction and provides secure merchant authentication services to a cardholder associated with the payment transaction.

Figure 5:
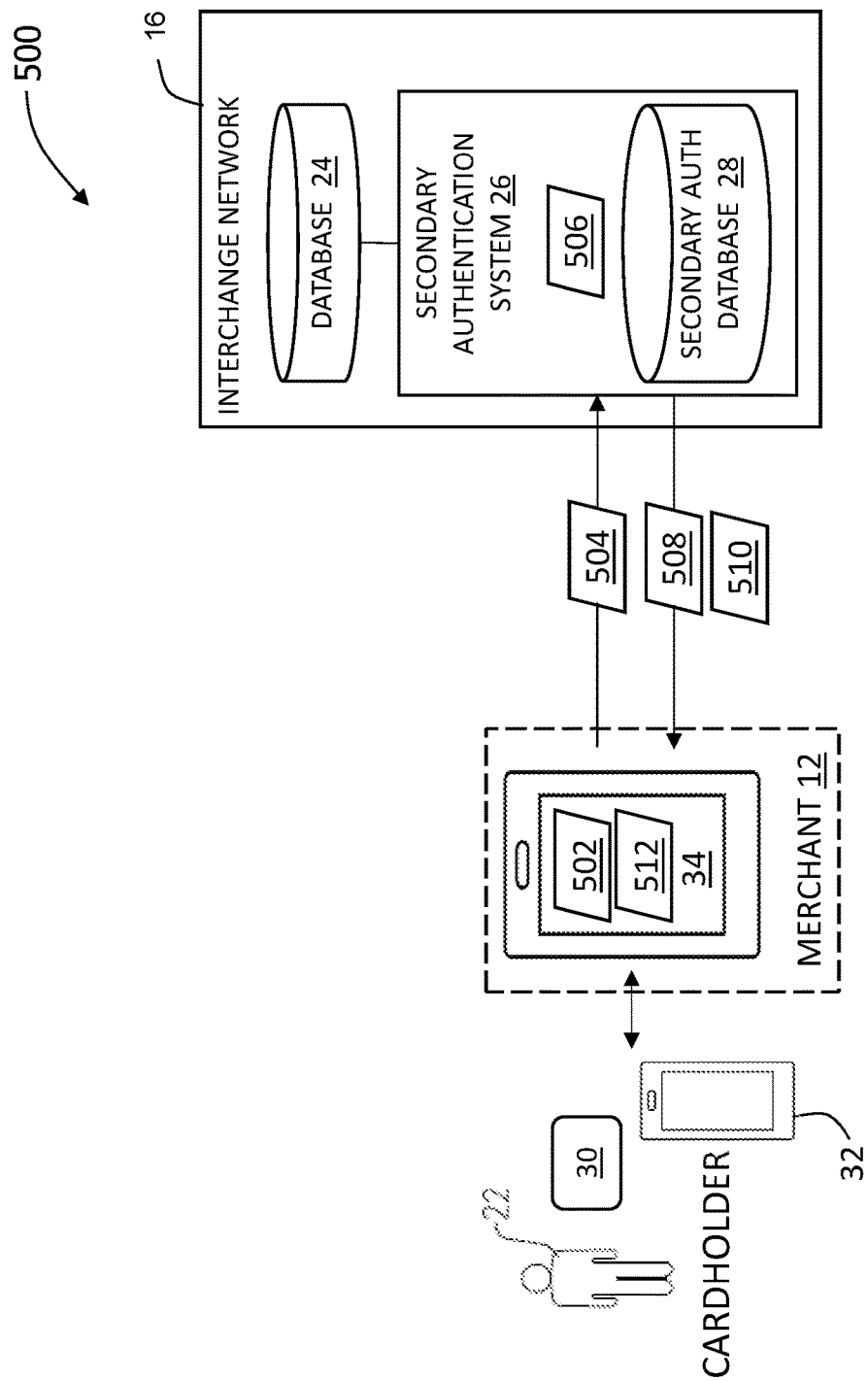
FIG. 5 is a schematic diagram showing operation of the secure merchant authentication system shown in FIG. 1.

FIG. 5 is a schematic diagram showing operation of a secure merchant authentication system 500. As described herein, the SMA component 26 is configured to receive requests from the software-based POS system 34 to authenticate the POS terminal before processing transactions against a cardholder's payment account. In some embodiments, the SMA component 26 is also in communication with an acquirer system, an issuer system (not shown), and/or the interchange network 16. In the example embodiment, the SMA component 26 is a component of a payment card network, such as the interchange network 16.

The SMA component 26 is preferably programmed to communicate with one or more POS terminals, such as the software-based POS system 34, via a POS software application 502, to receive account registration information 506 to facilitate establishing an account that is not registered with the SMA component 26. In particular, the account registration process creates a merchant account and associated credentials for use with the SMA component 26 and/or the POS software application 502. The merchant 12 enters the account registration information 504 for transmission to the SMA component 26. The account registration information 504 may include, for example, and without limitation, mobile device identification data, POS software application identification data, contact information, and the like, as described herein. The account registration information 504 may be stored in the SMA database 28. The SMA component 26 generates a merchant account 506 from the account registration information 504 for the merchant 12. Additionally, in the exemplary embodiment, the SMA component 26 may communicate with the POS software application 502 to send, receive, and store information related to, for example, and without limitation, transactions against a cardholder's payment account.

In the exemplary embodiment, the SMA component 26 transmits a dynamic hashed security token 508 to the software-based POS system 34, for example, via the POS software application 502. As described herein, upon registration and during each initialization of the software-based POS system 34, the SMA component 26 transmits a dynamic hashed security token 508 to the terminal. The dynamic hashed security token 508 is time limited (e.g., based on a predetermined period) and includes various data elements that may be viewed to help authenticate the software-based POS system 34 before a cardholder performs a transaction. The various data elements may include, for example, a merchant name, POS software application validation data, and/or a flag for whether the dynamic hashed security token 508 is Active or inactive (e.g., an ACTIVE/INACTIVE text indicator, color indicator, etc.). It is contemplated that additional or fewer data elements may be included with the dynamic hashed security token 508. In an example, a cardholder may select an icon (e.g., a merchant logo or other icon) displayed on the software-based POS system 34 to view the dynamic hashed security token data elements, for example, on a display of the terminal.

In the exemplary embodiment, upon registration, the SMA component 26 also transmits an offline smart token 510 to the software-based POS system 34, for example, via the POS software application 502. As described herein, the offline smart token 510 is a monitor configured to monitor application activity related to a transceiver of the software-based POS system 34, such as the communication interface 310 shown in FIG. 3. In particular, the offline smart token 510 monitors and/or examines an activity log that records applications requesting access to the transceiver of the software-based POS system 34. Thus, if an application, such as application 512, other than the registered POS software application 502 accesses transaction data being passed wirelessly via the transceiver (e.g., via an NFC transaction), the offline smart token 510 captures the account details (e.g., the PAN) and transmits the account details to the interchange network 16 and/or issuer 18, for example, for blacklisting of the account details.

Exemplary Computer-Implemented Method for Initializing POS Terminal

Figure 6:
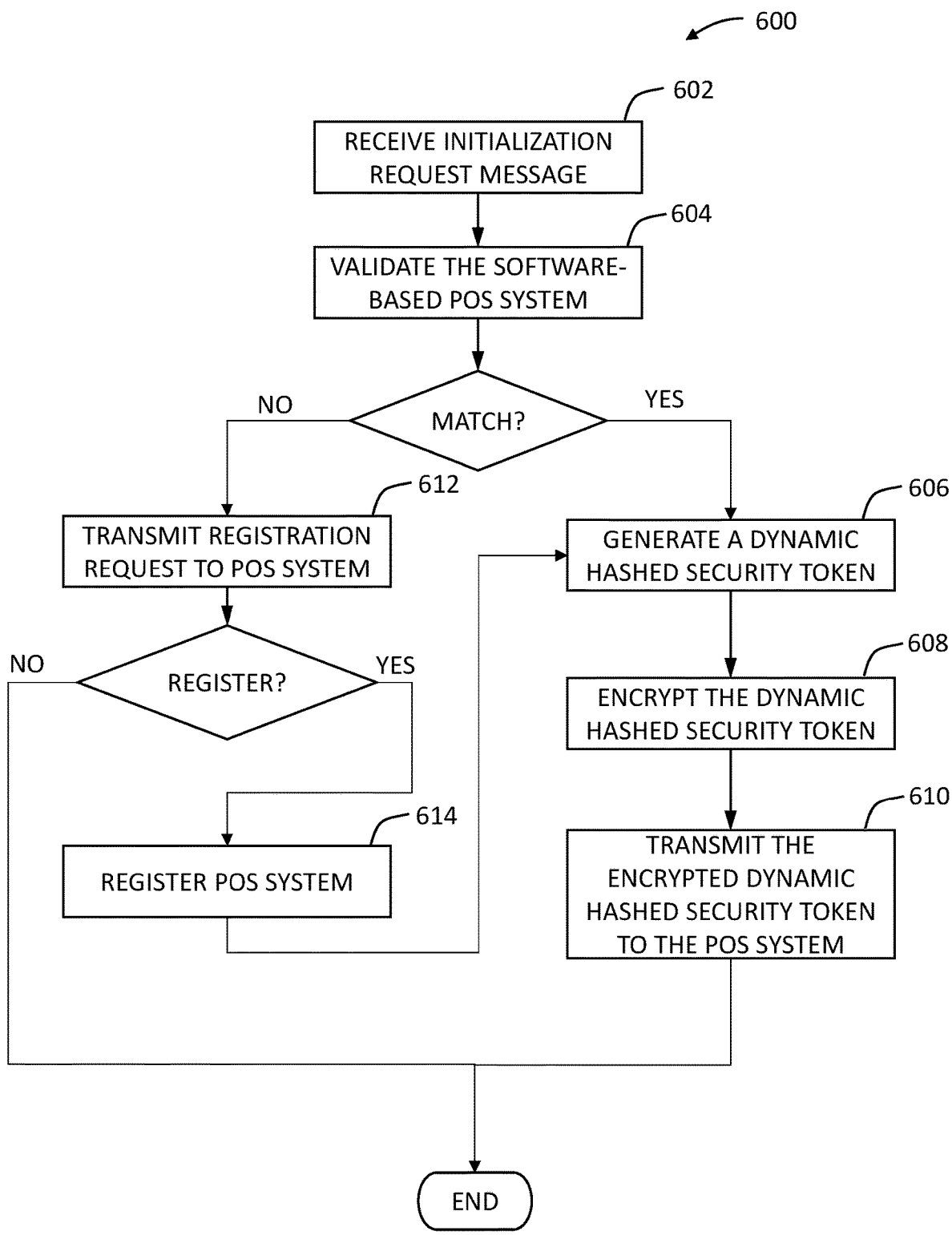
FIG. 6 is a flowchart illustrating an exemplary computer-implemented method for validating a software-based POS system of a merchant, in accordance with an aspect of the invention.

FIG. 6 is a flowchart illustrating an exemplary computer-implemented method 600 for validating a software-based POS system of a merchant, such as the software-based POS system 34 of the merchant 12 (shown in FIG. 1), in accordance with an aspect of the invention. The operations described herein may be performed in the order shown in FIG. 6 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 600 is described below, for ease of reference, as being executed by exemplary devices and components introduced with the embodiments illustrated in FIGS. 1-5. Preferably, the method 600 may be implemented by the SMA component 26 (shown in FIG. 1). In the exemplary embodiment, the method 600 relates to the registration and validation of a mobile or software-based POS terminal prior to performing a transaction. While operations of the method 600 are described below regarding the SMA component 26, the method 600 may be implemented on other computing systems and/or devices through the utilization of processors, hardware, software, firmware, or combinations thereof. Further, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 602, the SMA component 26 receives an initialization request from the software-based POS system 34. For example, in the exemplary embodiment, for each predetermined period, the first transaction the merchant 12 performs is an initialization transaction. The predetermined period may be, for example, daily, weekly, etc. The initialization transaction may be performed by the merchant 12, for example, by generating a payment authorization request message. It is noted that the messages within an interchange network, such as the interchange network 16, may in at least some instances, conform to the International Organization for Standardization (ISO) Standard 8583, Financial transaction card originated messages—Interchange message specifications, which is the ISO standard for systems that exchange electronic transactions made by cardholders using payment cards. In the example embodiment, the payment authorization request message can be an ISO 8583 message type identifier (MTI) 0100 message.

The payment authorization request message (i.e., the 0100 message) is transmitted to the acquirer 14 for processing and further transmission to the SMA component 26 (e.g., via the interchange network 16) for initialization. For example, the acquirer 14 communicates with and transmits the 0100 message to the SMA component 26. The payment authorization request message includes validation data to enable the SMA component 26 to validate the software-based POS system 34. For example, the payment authorization request message may include a POS terminal or hardware identifier, a merchant ID, an application identifier for the POS software application, and/or credentials for the merchant account, included in one or more data elements of the request message.

At operation 604, the SMA component 26 validates the software-based POS system 34 based on the validation data contained in the payment authorization request message. More particularly, the SMA component 26 extracts the validation data from the payment authorization request message and compares the validation data, such as the POS terminal or hardware identifier and the application identifier for the POS software application, to the data stored within the merchant account created during registration of the software-based POS system 34.

Based on a match of the validation data, at operation 606, the SMA component 26 generates a dynamic hashed security token, such as the dynamic hashed security token 508. The SMA component 26 may store a record of the dynamic hashed security token 508 in the database 28 for subsequent validation of payment transactions received from the software-based POS system 34. As described above, the dynamic hashed security token 508 is time limited, and as such, the dynamic hashed security token record may be recorded with a timestamp corresponding to the time and date of generation. Alternatively, the dynamic hashed security token record may be recorded with a timestamp corresponding to an expiration time and date. In one example, the period during which the dynamic hashed security token 508 is active and valid includes a period of twenty-four hours (24 hrs) after generation. In another embodiment, the period during which the dynamic hashed security token 508 is active and valid includes the period from the time of generation until about 11:59 PM of the same day of generation. The time may be based on the time zone of the merchant 12 or other time zone.

At operation 608, the dynamic hashed security token 508 is encrypted, for example, with SHA-256 or an equivalent or stronger encryption method. More particularly, the SMA component 26 encrypts the dynamic hashed security token 508 after generating the dynamic hashed security token 508. At operation 610, the SMA component 26 transmits the dynamic hashed security token 508 to the software-based POS system 34. The dynamic hashed security token 508 may be included as a data element in a response message, which can be an ISO 8583 message type identifier (MTI) 0110 message.

If the validation data does not match the data associated with the merchant account, at operation 612, the SMA component 26 transmits a registration request to the merchant requesting that the merchant perform a registration process to register the software-based POS system 34 and/or the POS software application 502. If the merchant refuses the registration request, the method ends. If the merchant selects to perform the registration process, the software-based POS system 34 and/or the POS software application 502 is registered at operation 612. The method then continues at operation 606.

Exemplary Computer-Implemented Method for Performing a Transaction

Figure 7:
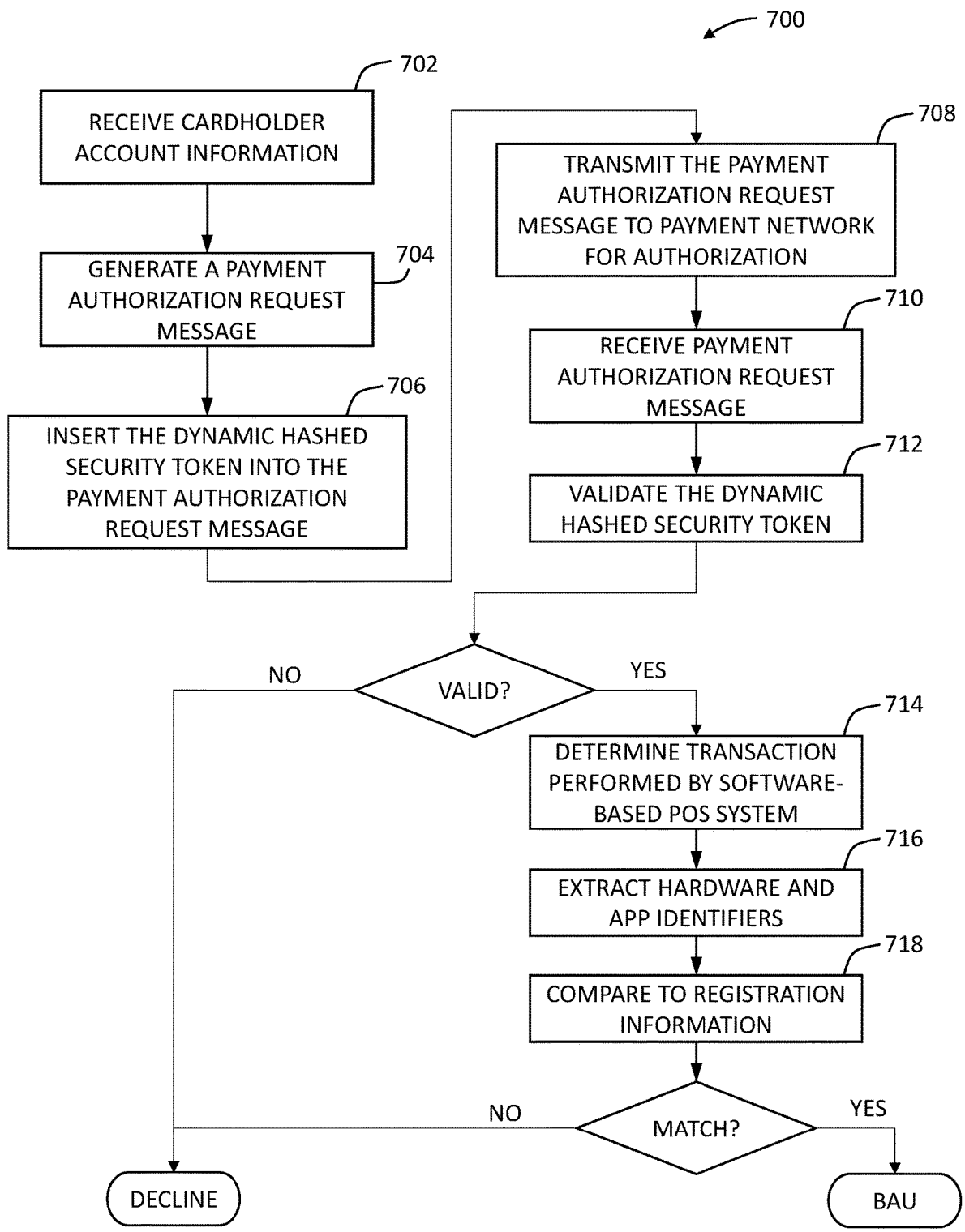
FIG. 7 is a flowchart illustrating an exemplary computer-implemented method for performing a transaction with a software-based POS system of a merchant, in accordance with an aspect of the invention.

FIG. 7 is a flowchart illustrating an exemplary computer-implemented method 700 for performing a transaction with a software-based POS system of a merchant, such as the software-based POS system 34 of the merchant 12 (shown in FIG. 1), in accordance with an aspect of the invention. The operations described herein may be performed in the order shown in FIG. 7 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 700 is described below, for ease of reference, as being executed by exemplary devices and components introduced with the embodiments illustrated in FIGS. 1-5. Preferably, the method 700 may be implemented by the SMA component 26 (shown in FIG. 1). In the exemplary embodiment, the method 700 relates to validating a transaction performed at a mobile or software-based POS terminal. While operations of the method 700 are described below regarding the SMA component 26, the method 700 may be implemented on other computing systems and/or devices through the utilization of processors, hardware, software, firmware, or combinations thereof. Further, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the example embodiment, the payment transaction is a card present transaction where the cardholder 22 initiates a payment transaction using, for example, and without limitation, a physical payment card 30 or digital wallet data using the mobile device 32 (each shown in FIG. 1) to transact with the merchant 12 (shown in FIG. 1) to purchase goods and/or services associated with the merchant 12. In the example embodiment, the merchant 12 includes the software-based POS system 34.

At operation 702, when the cardholder 22 selects to initiate a transaction with the merchant 12, the cardholder swipes, dips, or taps the payment card 30 or taps the mobile device 32 at the software-based POS system 34 to transfer the cardholder's account information to the POS terminal. In particular, the cardholder 22 transmits transaction data to the software-based POS system 34 via the swipe, dip, or tap of the payment card 30 or tap of the mobile device 32. The transaction data may include, for example, transaction information indicating a purchased item identifier associated with the goods and/or services the cardholder 22 would like to purchase from the merchant 12. The transaction data may also include a payment credential (e.g., the cardholder's PAN, digital wallet data, etc.).

At operation 704, the software-based POS system 34 (e.g., via the POS software application 502) generates a payment authorization request message for the transaction. As described above, in the example embodiment, the payment authorization request message can be an ISO 8583 message type identifier (MTI) 0100 message. The software-based POS system 34 inserts the transaction data into the payment authorization request message.

At operation 706, the software-based POS system 34 inserts the dynamic hashed security token 508 into the payment authorization request message. For example, the software-based POS system 34 inserts the dynamic hashed security token 508 into a predetermined data element of the payment authorization request message (i.e., the 0100 message).

At operation 708, the software-based POS system 34 transmits the payment authorization request message to the interchange network 16 for authorization. More particularly, the software-based POS system 34 transmits the payment authorization request message to the merchant acquirer 14, which forwards the payment authorization request message to the interchange network 16.

At operation 710, the SMA component 26 intercepts or otherwise receives the payment authorization request message, based on the dynamic hashed security token 508 being present in the predetermined data element. More particularly, the interchange network 16 or the acquirer 14 transmits the payment authorization request message to the SMA component 26 when the dynamic hashed security token 508 is present in the predetermined data element. In other embodiments, the SMA component 26 monitors incoming payment authorization request messages, and in particular, monitors the predetermined data element of incoming payment authorization request messages for the presence of the dynamic hashed security token 508.

At operation 712, the SMA component 26 validates the dynamic hashed security token 508 against the records stored in the database 28. For example, and without limitation, the SMA component 26 extracts the dynamic hashed security token 508 from the payment authorization request message and compares it to the dynamic hashed security token record associated with the merchant identified in the transaction data (e.g., via a merchant identifier) of the payment authorization request message. The dynamic hashed security token 508 is compared to its recorded expiry and authenticity information. If the dynamic hashed security token 508 is not valid, the transaction is declined.

If the dynamic hashed security token 508 is valid and active, at operation 714, the SMA checks data element twenty-two (DE22-Point of Service Entry Mode), subfield five-Cardholder Present Data, and determines whether the payment authorization request message was transmitted by a POS terminal (e.g., a self-checkout kiosk) running a mobile POS software application, such as the software-based POS system 34 running the POS software application 502. If the transaction was performed at a mobile POS terminal, such as the software-based POS system 34, the SMA component 26 extracts the hardware identifier and the application identifier for the POS software application 502 from the transaction data at operation 716, and compares it to the account registration information 506 stored with the merchant account on the database 28 at operation 718. If there is a mismatch, the transaction is declined. If the hardware identifier and the application identifier match the stored information, at operation 720, the transaction is processed business as usual (BAU), for example, by transmitting the payment authorization request message to the issuer, such as the issuer 18, for authorization.

Exemplary Computer-Implemented Method for Blacklisting Transaction Card Details

Figure 8:
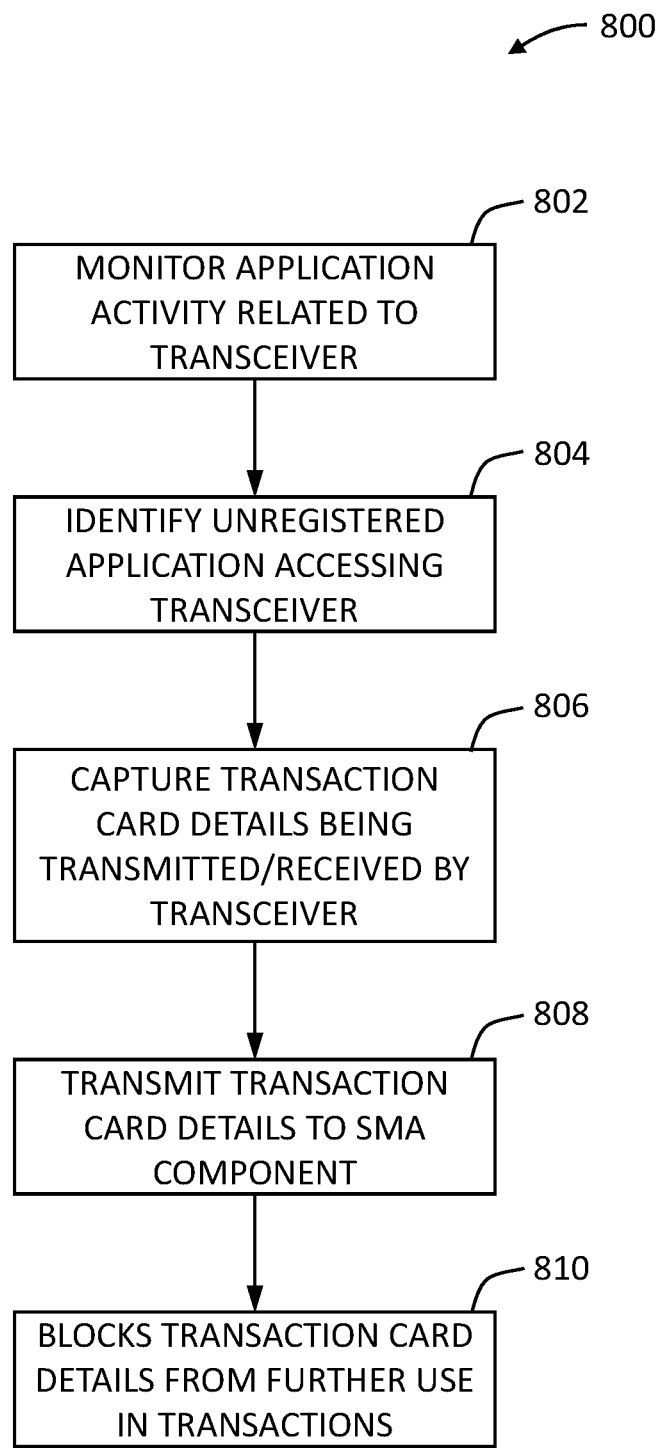
FIG. 8 is a flowchart illustrating an exemplary computer-implemented method for blacklisting transaction card details when a transaction is performed at a potentially compromised software-based POS system of a merchant, in accordance with an aspect of the invention.

FIG. 8 is a flowchart illustrating an exemplary computer-implemented method 800 for blacklisting transaction card details when a transaction is performed at a potentially compromised software-based POS system of a merchant, such as the software-based POS system 34 of the merchant 12 (shown in FIG. 1), in accordance with an aspect of the invention. The operations described herein may be performed in the order shown in FIG. 8 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 800 is described below, for ease of reference, as being executed by exemplary devices and components introduced with the embodiments illustrated in FIGS. 1-5. Preferably, the method 800 may be implemented by the SMA component 26 (shown in FIG. 1) and the smart offline token 510 (shown in FIG. 5). While operations of the method 800 are described below regarding the SMA component 26 and the smart offline token 510, the method 800 may be implemented on other computing systems and/or devices through the utilization of processors, hardware, software, firmware, or combinations thereof. Further, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

As described above, when a merchant registers his or her mobile POS terminal, such as the software-based POS system 34, the SMA component 26 transmits the offline smart token 510 to the software-based POS system 34, for example, via the POS software application 502.

At operation 802, the offline smart token 510 monitors application activity related to a transceiver of the software-based POS system 34, such as the communication interface 310 (shown in FIG. 3). In particular, the offline smart token 510 monitors and/or examines an activity log stored on the software-based POS system 34. The activity log records each access request by an application for access to the transceiver.

At operation 804, the offline smart token 510 identifies an application other than the registered POS application, such as the application 512 (shown in FIG. 5), accessing the transceiver of the software-based POS system 34. At operation 806, the offline smart token 510 captures the transaction card details (e.g., the PAN or payment token) being transmitted/received via the transceiver of the software-based POS system 34 (e.g., via NFC). At operation 808, the offline smart token 510 transmits the transaction card details to the SMA component 26.

Upon receipt of the transaction card details from the offline smart token 510, the SMA component 26 flags the transaction card in the database 28 and blocks further transactions using the transaction card details at operation

810. Furthermore, in some embodiments, the SMA component 26 transmits the compromised transaction card details to the associated issuer, such as the issuer 18, for further blocking of transactions.

Any actions, functions, operations, and the like recited herein may be performed in the order shown in the figures and/or described above or may be performed in a different order. Furthermore, some operations may be performed concurrently as opposed to sequentially. Although the methods are described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon, wherein the program instructs one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

ADDITIONAL CONSIDERATIONS

All terms used herein are to be broadly interpreted unless otherwise stated. For example, the term "payment card" and the like may unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

As used herein, the term "cardholder" may refer to the owner or rightful possessor of a payment card. As used herein, the term "cardholder account" may refer specifically to a PAN or more generally to an account a cardholder has with the payment card issuer and with which the PAN is or was associated. As used herein, the term "merchant" may refer to a business, a charity, or any other such entity that can generate transactions with a cardholder account through a payment card network.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at separate times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at separate times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a specific location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A computer-implemented method performed by a computing device, the method comprising:

receiving an initialization request from a software-based point-of-sale (POS) system operated by a merchant and separate from any cardholder device, the initialization request including validation data comprising a hardware identifier of the software-based POS system and an application identifier of a mobile POS software application;

validating, for initialization, the software-based POS system by matching the hardware identifier and the application identifier to account registration information stored with a merchant account on a database associated with the computing device;

in response to the matching, generating, by the computing device, a time limited dynamic hashed security token;

storing, in the database, a dynamic hashed security token record associated with the merchant account, the dynamic hashed security token record including timestamp information defining a validity period for the time limited dynamic hashed security token;

transmitting the time limited dynamic hashed security token to the software-based POS system;

receiving, from the software-based POS system, an ISO 8583 message type identifier (MTI) 0100 payment authorization request message, the MTI 0100 payment authorization request message including transaction data and the time limited dynamic hashed security token included in a predetermined data element of the MTI 0100 message, the transaction data including transaction card details, a hardware identifier of the software-based POS system, an application identifier associated with a mobile POS software application running on the software-based POS system, and a merchant identifier corresponding to the merchant;

monitoring the predetermined data element of the MTI 0100 message for the presence of the time limited dynamic hashed security token;

responsive to the presence, extracting the time limited dynamic hashed security token from the MTI 0100 payment authorization request message;

validating the time limited dynamic hashed security token, including comparing the extracted time limited dynamic hashed security token to the dynamic hashed security token record;

upon validating the time limited dynamic hashed security token, determining that the software-based POS system that transmitted the MTI 0100 payment authorization request message is running the mobile POS software application by parsing data element twenty-two (DE22) subfield five (5) of the MTI 0100 payment authorization request message;

based upon the determination, extracting the hardware identifier and the application identifier from the transaction data;

validating the software-based POS system, including comparing the hardware identifier and the application identifier to the account registration information;

determining that the hardware identifier and the application identifier match with the account registration information; and transmitting the MTI 0100 payment authorization request message to an issuer associated with the transaction card details only upon validating the time limited dynamic hashed security token and determining that the hardware identifier and the application identifier match with the account registration information.

2. The computer-implemented method in accordance with claim 1, wherein the time limited dynamic hashed security token has a predetermined expiration date, the operation of comparing the time limited dynamic hashed security token to the dynamic hashed security token record comprising comparing the predetermined expiration date to the expiration date included in the dynamic hashed security token record.

3. The computer-implemented method in accordance with claim 1, further comprising encrypting the time limited dynamic hashed security token before transmitting the time limited dynamic hashed security token to the software-based POS system.

4. A computing device comprising:

a database having a dynamic hashed security token record and a merchant account stored thereon, each being associated with a merchant, the merchant account further being associated with account registration information of the merchant;

a processor; and a memory device including computer-readable instructions stored thereon, that when executed by the processor, cause the processor to perform operations comprising:

receiving an initialization request from a software-based point-of-sale (POS) system operated by a merchant and separate from any cardholder device, the initialization request including validation data comprising a hardware identifier of the software-based POS system and an application identifier of a mobile POS software application;

validating, for initialization, the software-based POS system by matching the hardware identifier and the application identifier to account registration information stored with a merchant account on a database associated with the computing device;

in response to the matching, generating, by the computing device, a time limited dynamic hashed security token;

storing, in the database, the dynamic hashed security token record associated with the merchant account, the dynamic hashed security token record including timestamp information defining a validity period for the time limited dynamic hashed security token;

transmitting the time limited dynamic hashed security token to the software-based POS system;

receiving, from the software-based POS system, an ISO 8583 message type identifier (MTI) 0100 payment authorization request message, the MTI 0100 payment authorization request message including transaction data and the time limited dynamic hashed security token included in a predetermined data element of the MTI 0100 message, the transaction data including transaction card details, a hardware identifier of the software-based POS system, an application identifier associated with a mobile POS software application running on the software-based POS system, and a merchant identifier corresponding to the merchant;

monitoring the predetermined data element of the MTI 0100 message for the presence of the time limited dynamic hashed security token;

responsive to the presence, extracting the time limited dynamic hashed security token from the MTI 0100 payment authorization request message;

validating the time limited dynamic hashed security token, including comparing the extracted time limited dynamic hashed security token to the dynamic hashed security token record stored on the database;

upon validating the time limited dynamic hashed security token, determining that the software-based POS system that transmitted the MTI 0100 payment authorization request message is running the mobile POS software application by parsing data element twenty-two (DE22) subfield five (5) of the MTI 0100 payment authorization request message;

based upon the determination, extracting the hardware identifier and the application identifier from the transaction data;

validating the software-based POS system, including comparing the hardware identifier and the application identifier to the account registration information;

determining that the hardware identifier and the application identifier match with the account registration information; and transmitting the MTI 0100 payment authorization request message to an issuer associated with the transaction card details only upon validating the time limited dynamic hashed security token and determining that the hardware identifier and the application identifier match with the account registration information.

5. The computing device in accordance with claim 4, wherein the time limited dynamic hashed security token has a predetermined expiration date, the operation of comparing the time limited dynamic hashed security token to the dynamic hashed security token record comprising comparing the predetermined expiration date to the expiration date included in the dynamic hashed security token record.

6. The computing device in accordance with claim 4, the computer-readable instructions causing the processor to perform an operation comprising encrypting the time limited dynamic hashed security token before transmitting the time limited dynamic hashed security token to the software-based POS system.

7. A non-transitory computer readable storage medium comprising computer readable instructions that, when executed by a processor, cause the processor to perform operations comprising:

receiving an initialization request from a software-based point-of-sale (POS) system operated by a merchant and separate from any cardholder device, the initialization request including validation data comprising a hardware identifier of the software-based POS system and an application identifier of a mobile POS software application;

validating, for initialization, the software-based POS system by matching the hardware identifier and the application identifier to account registration information stored with a merchant account on a database associated with the computing device;

in response to the matching, generating, by the computing device, a time limited dynamic hashed security token;

storing, in the database, a dynamic hashed security token record associated with the merchant account, the dynamic hashed security token record including timestamp information defining a validity period for the time limited dynamic hashed security token;

transmitting the time limited dynamic hashed security token to the software-based POS system;

receiving, from the software-based POS system, an ISO 8583 message type identifier (MTI) 0100 payment authorization request message, the MTI 0100 payment authorization request message including transaction data and the time limited dynamic hashed security token included in a predetermined data element of the MTI 0100 message, the transaction data including transaction card details, a hardware identifier of the software-based POS system, an application identifier associated with a mobile POS software application running on the software-based POS system, and a merchant identifier corresponding to the merchant;

monitoring the predetermined data element of the MTI 0100 message for the presence of the time limited dynamic hashed security token;

responsive to the presence, extracting the time limited dynamic hashed security token from the MTI 0100 payment authorization request message;

validating the time limited dynamic hashed security token, including comparing the extracted time limited dynamic hashed security token to the dynamic hashed security token record;

upon validating the time limited dynamic hashed security token, determining that the software-based POS system that transmitted the MTI 0100 payment authorization request message is running the mobile POS software application by parsing data element twenty-two (DE22) subfield five (5) of the MTI 0100 payment authorization request message;

based upon the determination, extracting the hardware identifier and the application identifier from the transaction data;

validating the software-based POS system, including comparing the hardware identifier and the application identifier to the account registration information;

determining that the hardware identifier and the application identifier match with the account registration information; and transmitting the MTI 0100 payment authorization request message to an issuer associated with the transaction card details only upon validating the time limited dynamic hashed security token and determining that the hardware identifier and the application identifier match with the account registration information.

8. The computer readable storage medium in accordance with claim 7, wherein the time limited dynamic hashed security token has a predetermined expiration date, the operation of comparing the time limited dynamic hashed security token to the dynamic hashed security token record comprising comparing the predetermined expiration date to the expiration date included in the dynamic hashed security token record.

9. The computer readable storage in accordance with claim 7, wherein the computer readable instructions further cause the processor to perform the operations of:
encrypting the time limited dynamic hashed security token; and
transmitting the time limited dynamic hashed security token to the software-based POS system.

* * * * *